United States Patent [19]

Matzner

[11] Patent Number: 5,787,141
[45] Date of Patent: Jul. 28, 1998

[54] LOWER TIE PLATE OPTIMIZED FOR REDUCED PRESSURE DROP

[75] Inventor: Bruce Matzner, San Jose, Calif.

[73] Assignee: General Electric Company, Schenectady, N.Y.

[21] Appl. No.: 859,222

[22] Filed: May 19, 1997

[51] Int. Cl.$^6$ .................................................. G21C 3/322
[52] U.S. Cl. ............................................................ 376/352
[58] Field of Search ................................. 376/352, 443, 376/439

[56] References Cited

U.S. PATENT DOCUMENTS

| | | | |
|---|---|---|---|
| 4,767,595 | 8/1988 | Wolters, Jr. et al. | 376/352 |
| 5,483,564 | 1/1996 | Matzner | 376/352 |
| 5,488,634 | 1/1996 | Johansson et al. | 376/352 |
| 5,528,640 | 6/1996 | Johansson et al. | 376/352 |
| 5,627,866 | 5/1997 | Dunlap et al. | 376/446 |

*Primary Examiner*—Daniel D. Wasil
*Attorney, Agent, or Firm*—Nixon & Vanderhye

[57] ABSTRACT

A lower tie plate includes a lower, generally cylindrically shaped nozzle for communicating coolant through a transition section of the tie plate to a grid at the upper end of the lower tie plate. The transition section is in the geometric form of a truncated, inverted pyramid, with flat side walls intersecting the cylindrical nozzle and the undersurface of the square grid. In this manner, minimum pressure loss is achieved by the flow from the nozzle to the grid. A shaped body diverter, i.e., an inverted pyramid, may depend from the grid to divert the flow laterally with minimum pressure loss into regions where the flow is most needed in the fuel bundle, i.e., in and about the fuel rods rather than the water rods. The inverted solid may have coolant flow passages through the solid to direct the flow into registering openings in the grid.

8 Claims, 7 Drawing Sheets

LOWER TIE PLATE OPTIMIZED FOR REDUCED PRESSURE DROP

TECHNICAL FIELD

The present invention relates to a lower tie plate for a nuclear fuel bundle for use in a nuclear reactor and particularly relates to a lower tie plate constructed to flow coolant from the lower nozzle into the tie plate grid with minimum pressure loss.

BACKGROUND

A nuclear fuel bundle for a nuclear reactor comprises a plurality of upstanding nuclear fuel rods spaced one from the other and extending between upper and lower tie plates. The fuel rods are encased within a flow channel and form a nuclear fuel bundle constituting one of many in a nuclear reactor. The bundles are supported at their lower ends on a core support assembly which is engaged by the lower tie plate. Coolant water flows upwardly through a nozzle at the lower end of the lower tie plate and transitions between it and a perforated grid assembly at the upper end of the tie plate. The grid assembly has a plurality of openings for supporting the lower ends of the fuel rods, as well as adjacent apertures for flowing coolant through the grid into regions of the fuel bundle surrounding the fuel rods.

Flow through the lower tie plate in present designs is controlled by the entrance nozzle, which creates a jet-type flow in the body of the lower tie plate intermediate the nozzle and the grid. Because the lower tie plate provides a very short axial distance between the nozzle and the grid (typically a length-to-diameter ratio of approximately one), the jet of coolant passing through the nozzle reaches the grid with small expansion in the lateral direction. Since the flow area of the region immediately upstream of the grid is about three times the flow area through the nozzle section, this results in the coolant jet forming eddies at its interface with stagnant water within the body of the lower tie plate. That is, there is substantial eddying at the interface of the coolant jet and the surrounding stagnant fluid within the body of the lower tie plate which causes a pressure loss and diminishes hydraulic performance. The interior surfaces of prior lower tie plates effect a transition between the cylindrical nozzle and the grid by affording relatively large and immediate lateral expansion of the coolant flow as the coolant passes from the nozzle into the body of the lower tie plate. A conventional lower tie plate, while having flat interior side surface portions in a generally pyramidal shape, also has arcuate surfaces at the interface of the flat side portions. Moreover, these flat surfaces have a very short length in the axial direction of flow and terminate in a square opening well in advance of the undersurface of the grid. Consequently, the coolant flow forms substantial eddy currents as it flows past otherwise stagnant fluid, as well as the sharp angles necessary to laterally expand the flow from the axial flow and return the laterally expanded flow to the axial flow through the grid.

DISCLOSURE OF THE INVENTION

In accordance with the present invention, there are provided lower tie plate designs specifically configured to minimize the pressure loss as the flow passes from the circular inlet nozzle at the lower end of the lower tie plate and transitions to the square grid at the upper portion of the lower tie plate. Ideally, the flow should not be allowed to separate from the confining walls and should experience a relatively small constant rate of expansion from the cylindrical nozzle area to the maximum flow area in the fully expanded region within the body of the lower tie plate directly adjacent the grid. A further refinement of this invention reduces the large expansion/contraction effect entering the smaller flow area available through the grid. To approach a constant rate of expansion and achieve the objectives of the present invention, the present tie plate provides an interior wall surface forming the transition between the cylindrical nozzle and the underside of the grid in the form of an inverted truncated pyramid. That is, the side walls of the lower tie plate body intermediate the nozzle and grid are flat and extend linearly from the nozzle to the grid to provide a smaller volume of stagnant fluid as compared with prior lower tie plate nozzles. At the nozzle, the bottom of the truncated pyramid forms an intersection with the cylindrical shape of the nozzle to provide the most uniform possible expansion of the flow area formed by the confines of the lower tie plate. Transition angles are not as sharp as in conventional tie plates and the volume of fluid available to produce eddying is reduced.

In a second aspect of the present invention, the reduction in pressure drop of the flow through the lower tie plate is enhanced by providing an inverted pyramid-shaped solid with its base attached to the lower tie plate grid. Because cooling flow about water rods is not required in a nuclear fuel bundle, the solid is preferably located directly below the water rods. Hence, the flow is diverted from the cylindrical nozzle into the passages between the outer flat walls of the solid depending from the grid and the inner flat walls of the tie plate body for flow to the grid. In a further aspect, the solid may have a plurality of vertical openings or flow passages which interface with the holes through the grid in the lower tie plate to enable flow to pass easily through the grid. Additionally, the hydraulic resistance through the holes can be adjusted so that it is possible to control locally the flow emanating from the lower tie plate.

In a preferred embodiment according to the present invention, there is provided a lower tie plate for a nuclear fuel bundle comprising a lower tie plate body having upper and lower end portions and wall portions forming an inverted truncated pyramid extending between the upper and lower end portions and defining a flow passage having a central axis, a lower tie plate grid adjacent an upper end portion of the tie plate body, the lower end portion including a generally circular nozzle forming part of the flow passage and intersecting the pyramidal wall portions to provide a generally uniform expansion of the flow through the passage, each wall portion comprising a flat surface with adjacent pairs thereof intersecting one another at a junction forming a straight line, the flat surfaces extending from a transition with the cylindrical nozzle to a juncture adjacent the grid.

In a further preferred embodiment according to the present invention, there is provided a lower tie plate for a nuclear fuel bundle comprising a lower tie plate body having upper and lower end portions and wall portions extending between the upper and lower end portions and defining a flow passage having a central axis, a lower tie plate grid adjacent an upper end portion of the tie plate body, the lower end portion including a generally circular nozzle forming part of the flow passage and intersecting the wall portions to provide a generally uniform expansion of the flow through the passage, a flow diverter located below the grid and carried by the lower tie plate body, the diverter being disposed in the flow passage and spaced from the wall portions.

Accordingly, it is a primary object of the present invention to provide a lower tie plate configuration optimized for reducing pressure losses of coolant/moderator flow through the lower tie plate.

BEST MODE FOR CARRYING OUT THE INVENTION

Figure 1A:
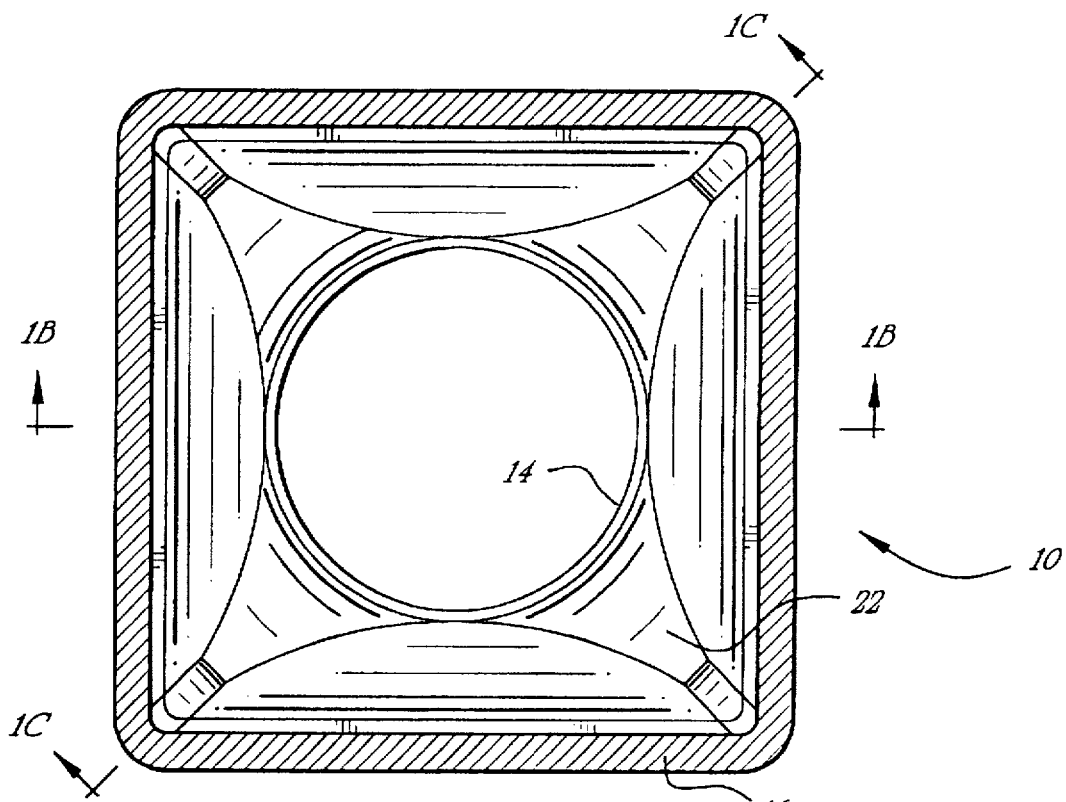
FIG. 1A is a horizontal cross-sectional view through an upper portion of a prior art lower tie plate below its grid illustrating the cylindrical nozzle opening adjacent the lower end and the transition walls.
Figure 1B:
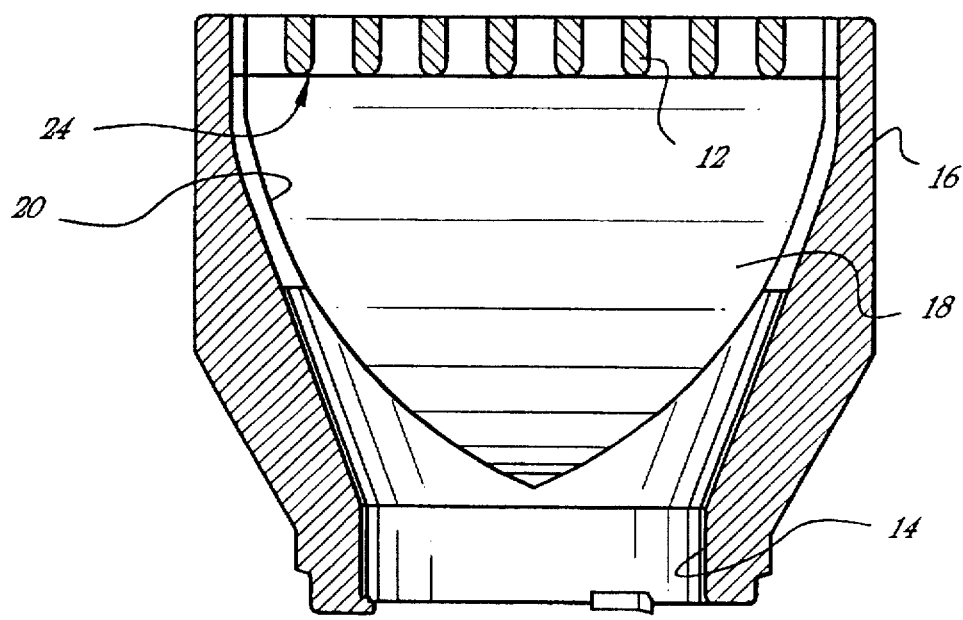
FIGS. 1B and 1C are cross-sectional views thereof taken generally about on lines 1B—1B and 1C—1C in FIG. 1A, respectively.
Figure 1C:
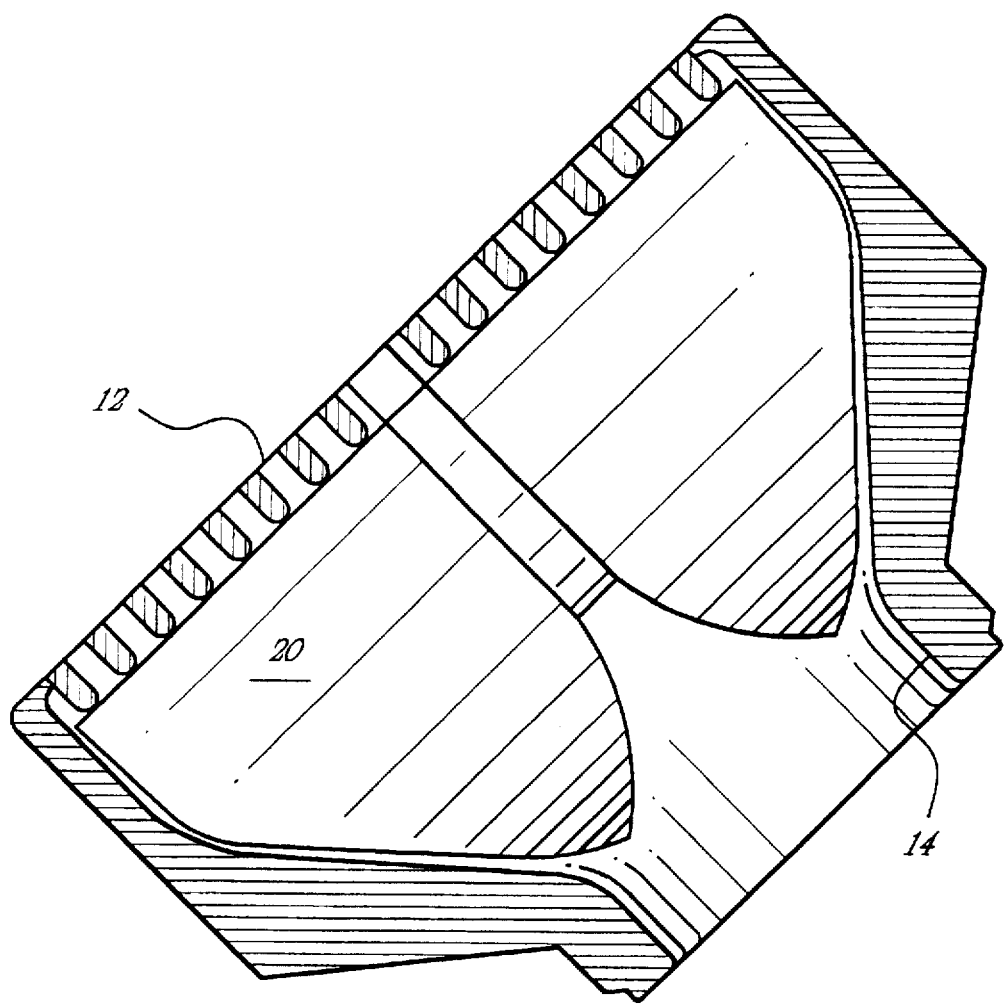

Referring now to FIGS. 1A–1C, there is illustrated a lower tie plate, generally designated 10, according to the prior art, comprised of an upper grid plate 12 (FIG. 1B), a lower cylindrical nozzle 14 and a tie plate body 16 defining a transition volume 18 between the cylindrical nozzle 14 and the grid plate 12. In this prior art construction, the transition volume 18 is defined in part by side walls 20, lower portions of which interconnect with adjacent side walls 20 through arcuate sections 22. The side walls 20 and the arcuate sections 22 essentially form a bowl which flares transversely or radially outwardly sharply as flow passes axially through the cylindrical opening 14 and into the body 16. The side walls 20 and arcuate sections 22 terminate at their upper ends in rectilinear or square sections 24 which form a sub-transition into the lower surface of the grid 12. It will be seen that there are a substantial number of angles over which the flow passes and generally an insufficient axial distance between the cylindrical nozzle 14 and the grid plate 12 to permit the jet of fluid passing through the nozzle to expand laterally within the body 16 to afford uniform flow through the grid plate without pressure loss. As explained earlier, the jet of coolant flowing through the cylindrical nozzle 14 forms eddies with adjacent relatively stagnant coolant/moderator within the body 16. Additionally, the sharp angles of the lower tie plate walls produce increased volume of eddying fluid in making the transition from the cylindrical nozzle 14 to the square section 24 of the grid plate 12, causing additional pressure drop.

Figure 2A:
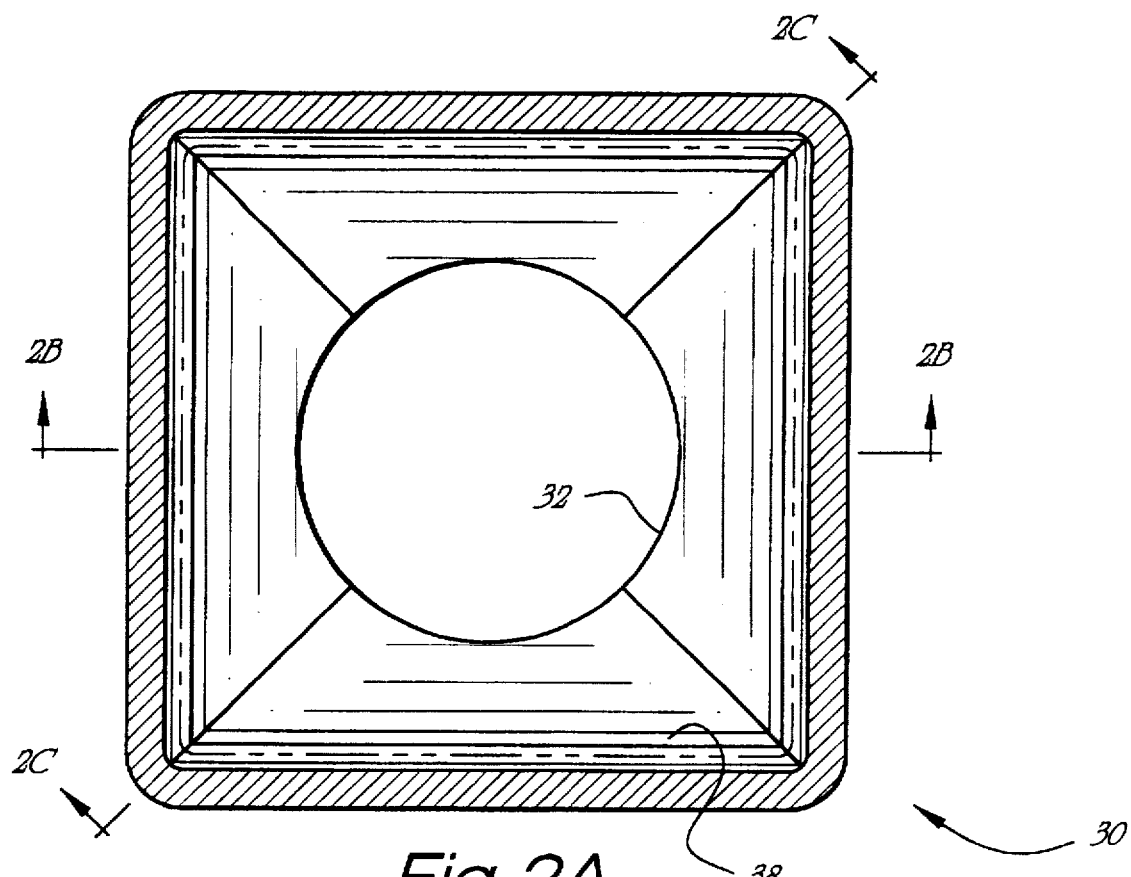
FIG. 2A is a view similar to FIG. 1A illustrating a lower tie plate constructed in accordance with the present invention.
Figure 2B:
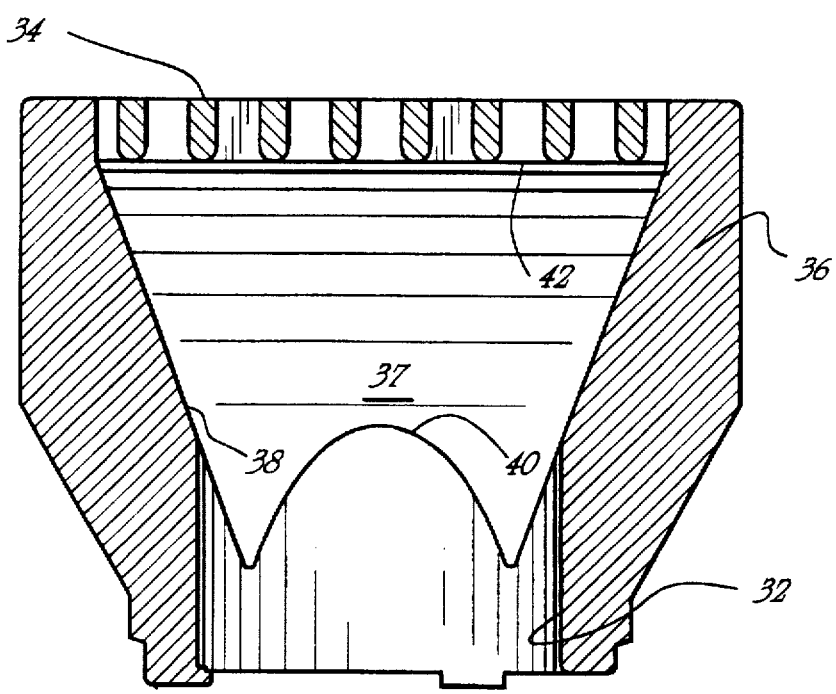
FIGS. 2B and 2C are cross-sectional views thereof taken generally about on line 2B—2B and 2C—2C in FIG. 2A, respectively.
Figure 2C:
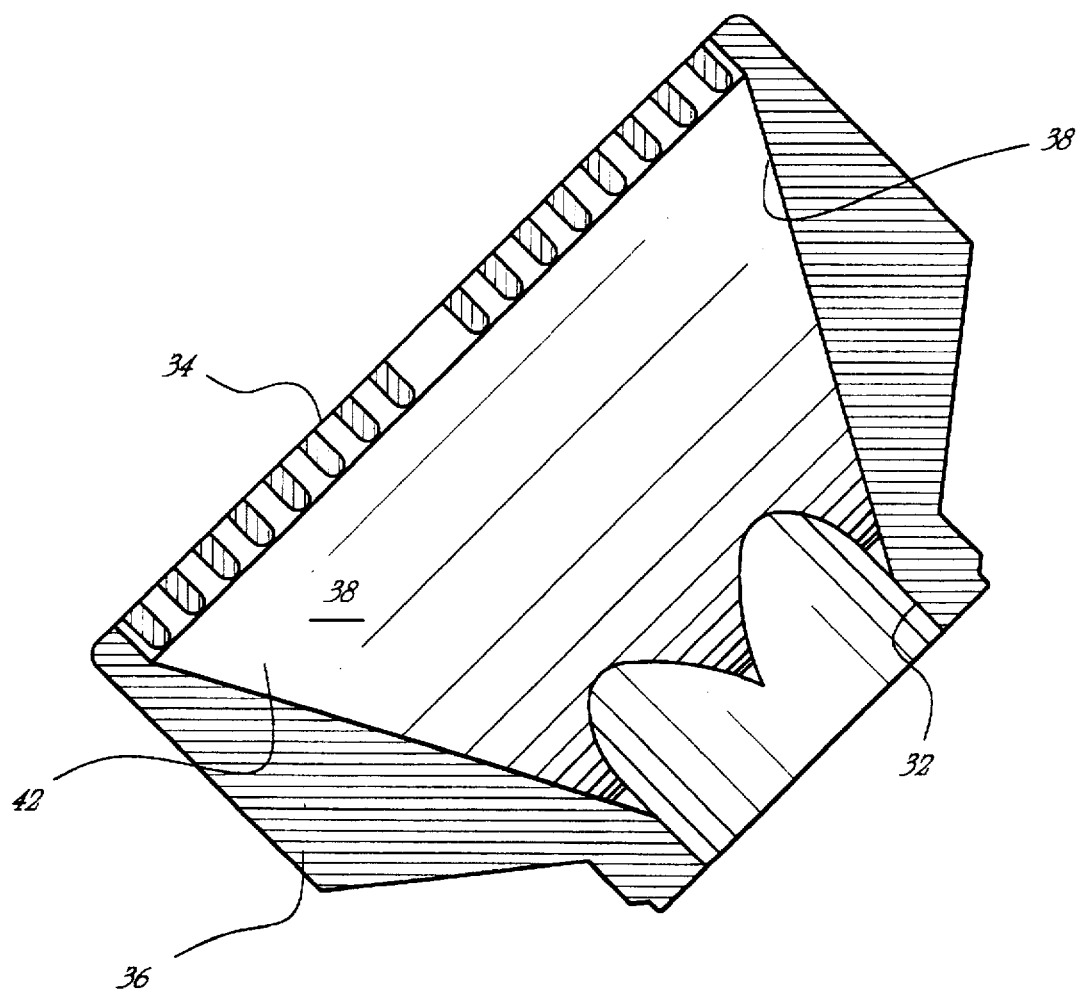

Referring now to the lower tie plate according to the present invention, generally designated 30 in FIGS. 2A–2C, there is illustrated a lower, generally cylindrical coolant nozzle 32, an upper grid 34 and a lower tie plate body 36 forming a transition volume 37 between the nozzle 32 and upper grid 34. In this tie plate construction, however, the transition between the nozzle 32 and the grid 34 is in the form of an inverted truncated pyramid having flat side walls 38 and which walls directly intersect the cylindrical nozzle 32 and lie more directly adjacent the undersurface of the grid 34. Thus, as illustrated in FIG. 2A, the flat side walls 38 form an arcuate transition 40 with the cylindrical nozzle 32 and a linear transition 42 adjacent the undersurface of grid 34. The truncated pyramidal interior shape of the lower tie plate body 36 thus makes use of substantially the entire axial distance between the cylindrical nozzle 32 and the grid 34 to effect the lateral expansion of the coolant flow passing into the body through nozzle 32, i.e., a reduced expansion/contraction pressure loss than in the prior art illustrated in FIGS. 1A–1 C. Sharp angles are also eliminated, the transition angles from the cylindrical nozzle 32 to the side walls 38 and from the side walls to the grid are smaller and gentler in comparison with the prior art, and, as a consequence, eddying effects are likewise reduced.

Figure 3A:
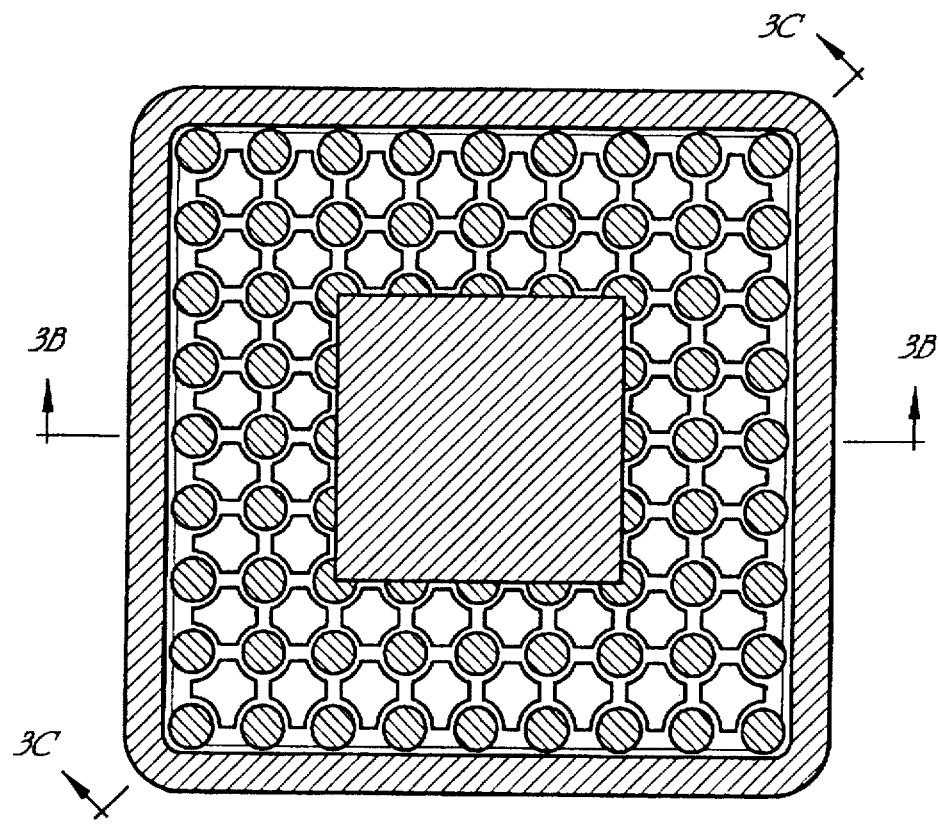
FIG. 3A is a cross-sectional view of the lower tie plate grid illustrating a further form of the present invention taken generally about on line 3A—3A in FIG. 3B.
Figure 3B:
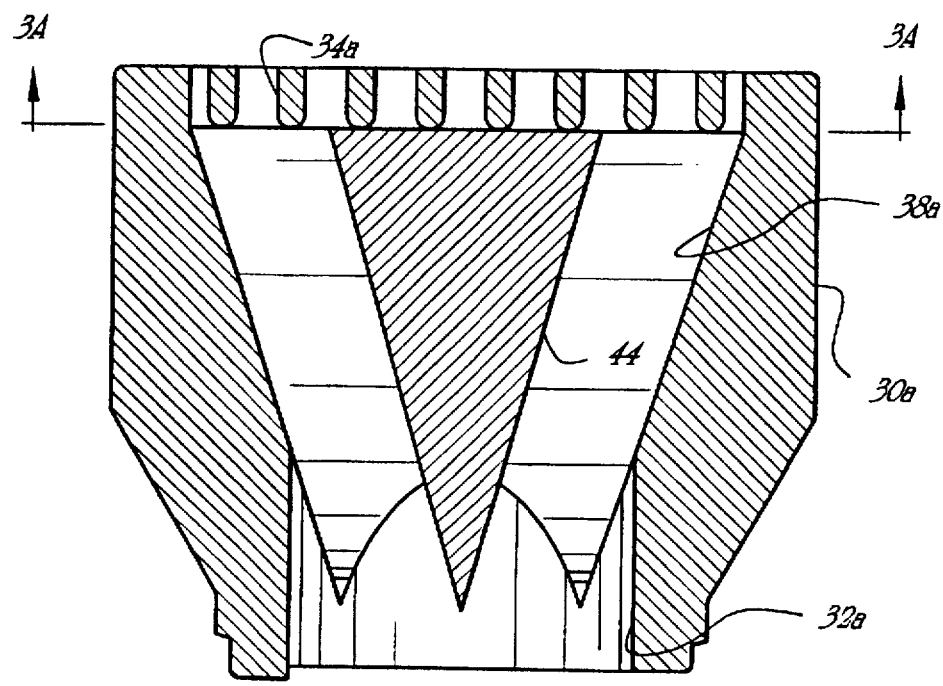
FIGS. 3B and 3C are cross-sectional views thereof taken generally about on lines 3B—3B and 3C—3C in FIG. 3A.
Figure 3C:
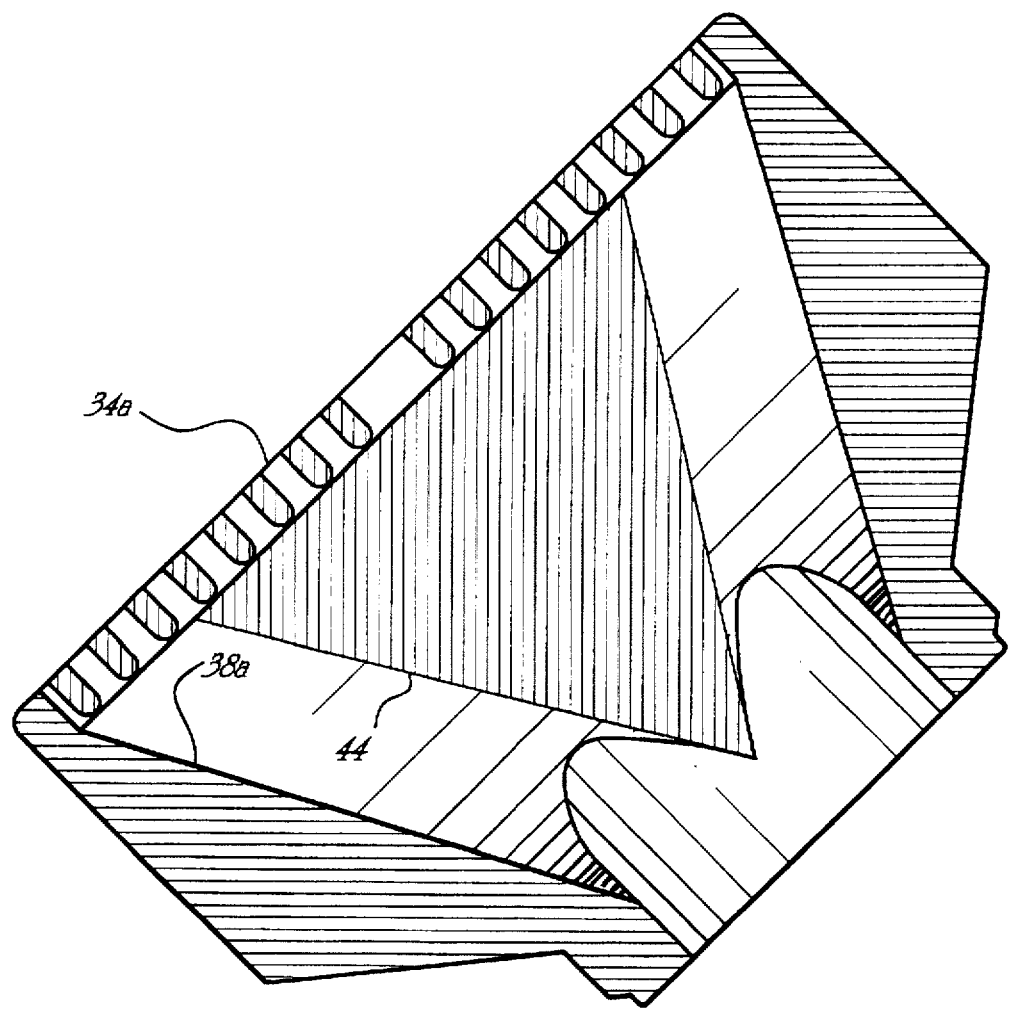

Referring now to the embodiment of the present invention illustrated in FIGS. 3A–3C wherein like reference numerals are applied to like parts as in the embodiments of FIGS. 2A–2C, followed by the suffix "a", the lower tie plate 30a is identical to the lower tie plate 30 of the prior embodiment, with the exception of the addition of a shaped solid 44, preferably depending from the grid 34a, although it will be appreciated that the solid 44 could be supported otherwise from the side walls of the lower tie plate. The depending solid 44 in this form takes on an inverted pyramid shape oriented about the axis of the lower tie plate such that the flat walls of the pyramidal solid 44 lie opposite the flat walls 38a of the truncated pyramid along the interior walls of the tie plate body. Consequently, flow entering the tie plate body 30a through the cylindrical 30 nozzle 32a flows in the generally rectilinear space between the solid 44 and the flat walls 38a and into the openings through the grid 34a. Preferably, the depending solid 44 is sized horizontally to be at least in the shadow of any water rods within the fuel bundle, it being appreciated that the water rods do not require cooling flow. Thus, the flow of coolant through the cylindrical nozzle 32a and the rectilinear passages defined by and about the depending pyramid 44 is fanned out laterally by the assistance of the depending solid 44 with minimum pressure drop and over a greater axial extent than in the prior art.

Figure 4:
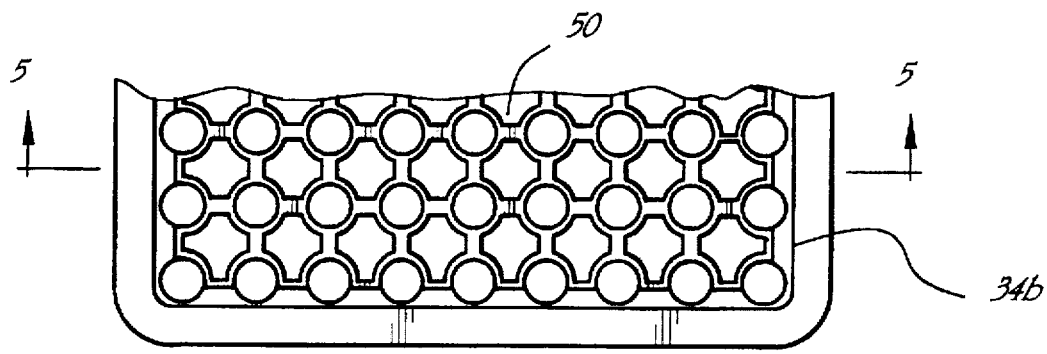
FIG. 4 is a fragmentary top plan view of the grid of an upper tie plate according to a further embodiment of the present invention.
Figure 5:
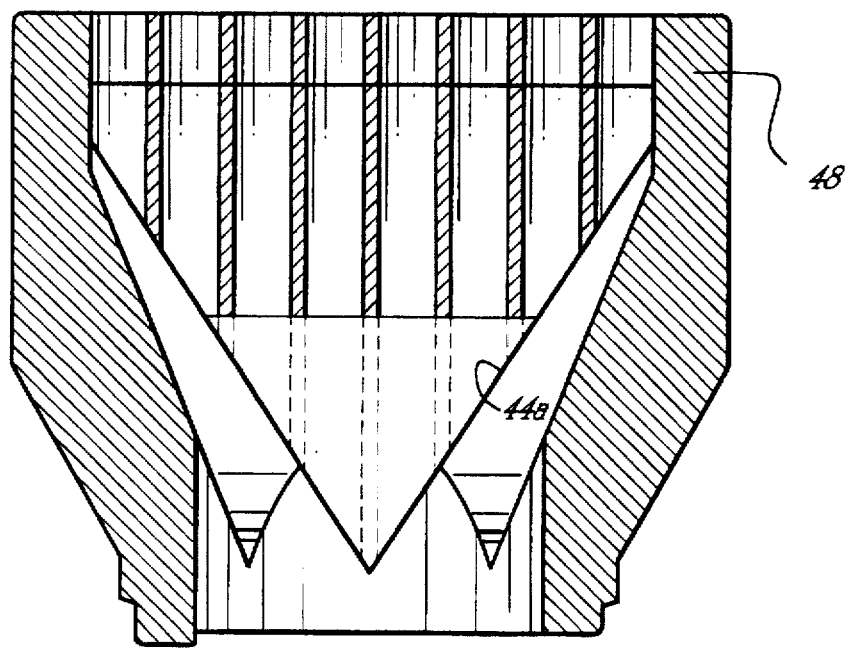
FIG. 5 is a cross-sectional view thereof taken generally about on line 5—5 in FIG. 4

Referring now to the form of the invention illustrated in FIGS. 4 and 5 wherein like reference numerals are applied to like parts as in the prior embodiments, followed by the suffix "b", the solid 44b extends across the entire undersurface of the grid 34b. Additionally, vertical holes 48 are passed through the depending inverted pyramid 44b for communicating coolant flow through the cylindrical nozzle and the openings in the grid whereby the coolant flow is readily and easily passed through the grid about the fuel rods disposed directly above the grid. Thus, each hole or opening 48 through the inverted pyramid is registered with one or more holes 50 in the grid lying between the adjacent fuel rods for supplying coolant to that region. Additionally, the holes 48 through the inverted pyramid 44b can be further refined by adjusting the hydraulic resistance of each hole so that local control of flow emanating from the lower tie plate into the fuel bundle is achieved.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A lower tie plate for a nuclear fuel bundle comprising:
   a lower tie plate body having upper and lower end portions and wall portions forming an inverted truncated pyramid extending between said upper and lower end portions and defining a flow passage having a central axis;
   a lower tie plate grid adjacent an upper end portion of said tie plate body;
   said lower end portion including a generally circular nozzle forming part of said flow passage and intersecting said pyramidal wall portions to provide a generally uniform expansion of the flow through said passage;
   each wall portion comprising a flat surface with adjacent pairs thereof intersecting one another at a junction forming a straight line, said flat surfaces extending from a transition with the cylindrical nozzle to a juncture adjacent the grid.

2. A lower tie plate according to claim 1 wherein said circular nozzle includes a surface of revolution about said axis through said tie plate body and intersecting said straight wall portions of said body.

3. A lower tie plate according to claim 2 wherein the surface of revolution and each of the flat wall portions intersect to form an arcuate edge of intersection.

4. A lower tie plate according to claim 3 wherein said arcuate edges of intersection terminate at an apex at adjoining edges of the pyramidal wall portions at the lower end portions of the body.

5. A lower tie plate according to claim 1 including a flow diverter carried by said lower tie plate body and disposed in said flow passage, said diverter being spaced from the pyramidal wall portions.

6. A lower tie plate according to claim 5 wherein said flow diverter is located below said grid.

7. A lower tie plate according to claim 6 wherein said diverter is attached to said grid.

8. A lower tie plate according to claim 6 wherein said grid has holes for flowing coolant through the grid, said diverter having openings therethrough for flow of coolant and having exits in registry with said openings through said grid for flowing coolant from said nozzle through said openings and holes.

* * * * *